United States Patent
Miyamoto et al.

(10) Patent No.: US 9,225,863 B2
(45) Date of Patent: Dec. 29, 2015

(54) IMAGE FORMING APPARATUS ENSURING WEIGHT BALANCE WHEN OPENING/CLOSING DOCUMENT READING UNIT AND DOCUMENT COVER

(71) Applicant: Kyocera Document Solutions Inc., Osaka (JP)

(72) Inventors: Teruyuki Miyamoto, Osaka (JP); Yasuyuki Fukunaga, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 14/447,656

(22) Filed: Jul. 31, 2014

(65) Prior Publication Data

US 2015/0036196 A1   Feb. 5, 2015

(30) Foreign Application Priority Data

Jul. 31, 2013   (JP) ................. 2013-159846

(51) Int. Cl.
- *H04N 1/04* (2006.01)
- *G03G 15/00* (2006.01)
- *H04N 1/00* (2006.01)
- *H04N 1/12* (2006.01)

(52) U.S. Cl.
CPC ....... *H04N 1/00551* (2013.01); *H04N 1/00557* (2013.01); *H04N 1/121* (2013.01); *H04N 2201/0094* (2013.01); *H04N 2201/0446* (2013.01)

(58) Field of Classification Search
CPC .......... G03G 21/16; G03G 2221/1687; G03G 2221/1654; G03G 2221/169; G03G 2221/183; H04N 1/00551; H04N 1/00557
See application file for complete search history.

(56) References Cited

U.S. PATENT DOCUMENTS

| | | | | |
|---|---|---|---|---|
| 4,989,099 A * | 1/1991 | Koshiyouji et al. | ........... | 358/474 |
| 5,534,989 A * | 7/1996 | Rubscha et al. | ........... | 399/381 |
| 6,308,029 B1 * | 10/2001 | Yamamoto | ........... | 399/117 |
| 7,747,196 B2 * | 6/2010 | Nobuoka et al. | ........... | 399/124 |
| 8,089,666 B2 * | 1/2012 | Andoh et al. | ........... | 358/498 |
| 8,154,770 B2 * | 4/2012 | Shiraki et al. | ........... | 358/401 |
| 8,237,995 B2 * | 8/2012 | Yamazaki et al. | ........... | 358/474 |
| 8,514,464 B2 * | 8/2013 | Takamura et al. | ........... | 358/474 |
| 8,570,624 B2 * | 10/2013 | Nagashima | ........... | 358/498 |
| 8,582,183 B2 * | 11/2013 | Westcott et al. | ........... | 358/474 |
| 8,587,845 B2 * | 11/2013 | Yonemura et al. | ........... | 358/498 |
| 2009/0109504 A1 | 4/2009 | Hirokawa | | |
| 2011/0211223 A1 * | 9/2011 | Ito | ........... | 358/1.15 |

FOREIGN PATENT DOCUMENTS

JP   2008-262037 A   10/2008

* cited by examiner

*Primary Examiner* — Cheukfan Lee
(74) *Attorney, Agent, or Firm* — James W. Judge (57) ABSTRACT

An image forming apparatus includes an image forming apparatus body, a document reading unit, a document cover, an image reading unit, an image forming unit, a reading-unit-supporting shaft, and a cover-supporting shaft. The document reading unit is configured to turn to openably/closably cover an upper portion of the image forming apparatus body. The document cover is configured to turn to openably/closably cover a document loading surface at a top surface of the document reading unit. The image forming unit is housed in the image forming apparatus body, the image forming unit being configured to form an image on a paper sheet based on the image data. The reading-unit-supporting shaft is configured to pivotably support the document reading unit. The cover-supporting shaft is configured to pivotably support the document cover. Both the reading-unit-supporting shaft and the cover-supporting shaft are mounted to the image forming apparatus body.

4 Claims, 11 Drawing Sheets

Related Art

IMAGE FORMING APPARATUS ENSURING WEIGHT BALANCE WHEN OPENING/CLOSING DOCUMENT READING UNIT AND DOCUMENT COVER

CROSS-REFERENCE TO RELATED APPLICATION

This application is based upon, and claims the benefit of priority from, corresponding Japanese Patent Application No. 2013-159846 filed in the Japan Patent Office on Jul. 31, 2013, the entire contents of which are incorporated herein by reference.

BACKGROUND

Unless otherwise indicated herein, the description in this section is not prior art to the claims in this application and is not admitted to be prior art by inclusion in this section.

There is known an image forming apparatus where a document reading unit is openably/closably mounted on the upper portion of the image forming apparatus body by a hinge part. An opening is formed on the top surface of the document reading unit. An exposure glass is embedded in the opening. The top surface of the exposure glass is formed as a document loading surface to place an original document. A scanner device is housed within the document reading unit. The scanner device optically reads the original document placed on the document loading surface to generate its image data. A document cover is openably/closably mounted on the top surface of the above-described document reading unit by a hinge.

For such image forming apparatus, turning the document reading unit around the hinge as pivot equal to or more than a predetermined degree with the document cover opened may cause the image forming apparatus to lose the weight balance of the entire apparatus and to be toppled.

In order to solve this problem, for example, there is a technique that provides a connection capable of the document cover to the image forming apparatus body with a link mechanism so as to maintain the constant degree of the document cover with respect to the image forming apparatus body even if the document reading unit is opened and closed.

For example, there is a technique that provides a lock mechanism that locks the document cover so as to prevent the document cover from turning around the hinge as pivot while the document reading unit is in open state.

SUMMARY

An image forming apparatus according to the disclosure includes an image forming apparatus body, a document reading unit, a document cover, an image reading unit, an image forming unit, a reading-unit-supporting shaft, and a cover-supporting shaft. The document reading unit is configured to turn to openably/closably cover an upper portion of the image forming apparatus body. The document cover is configured to turn to openably/closably cover a document loading surface at a top surface of the document reading unit. The image reading unit is configured to read an original document placed on the document loading surface and to generate image data of the original document. The image forming unit is housed in the image forming apparatus body, the image forming unit being configured to form an image on a paper sheet based on the image data. The reading-unit-supporting shaft is configured to pivotably support the document reading unit. The cover-supporting shaft is configured to pivotably support the document cover. Both the reading-unit-supporting shaft and the cover-supporting shaft are mounted to the image forming apparatus body.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of embodiments of the disclosure with reference to the drawings, the disclosure will not be limited to the embodiments described below.

Embodiment 1

Figure 1:
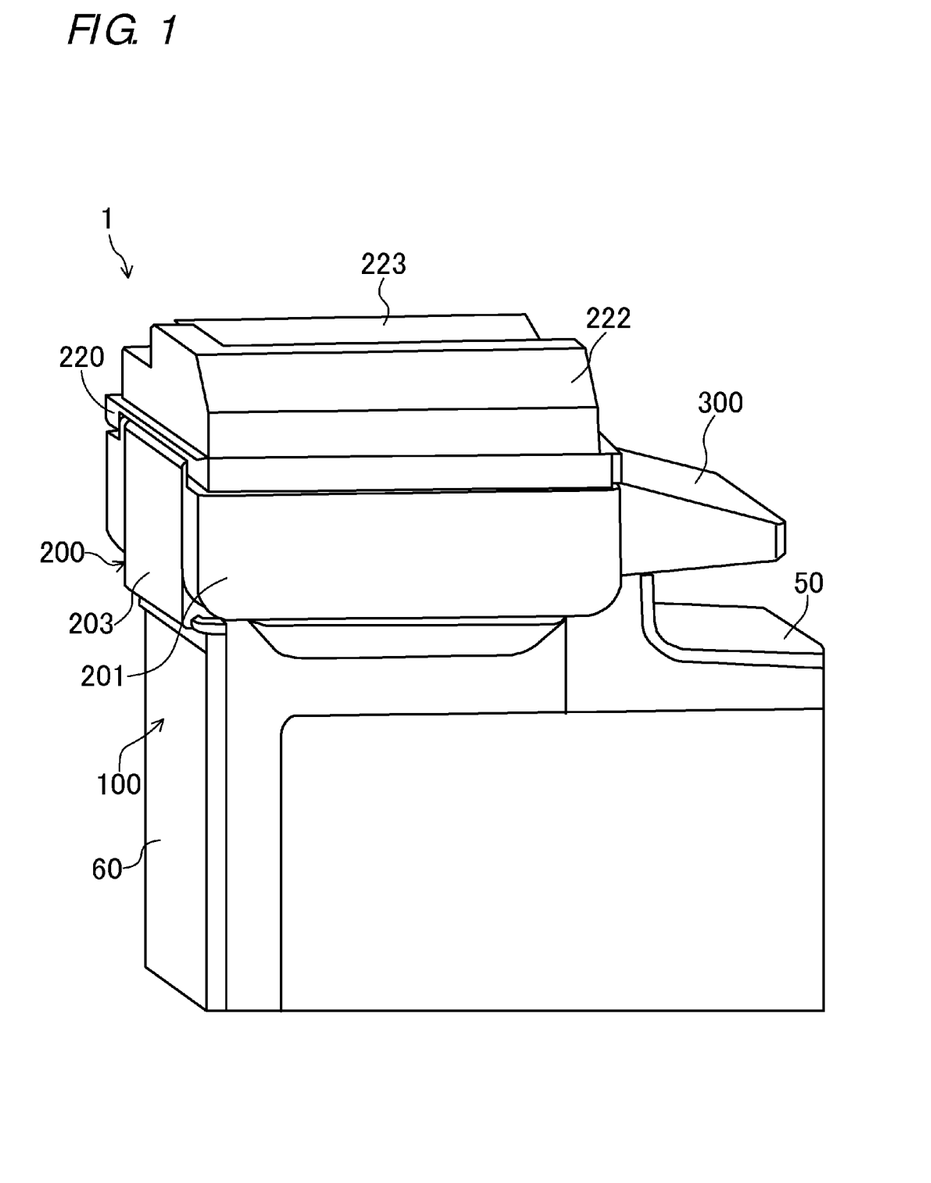
FIG. 1 illustrates an image forming apparatus according to one embodiment of the disclosure viewed from a diagonally backward of the left side of the apparatus.

FIG. 1 illustrates a laser printer 1 (hereinafter simply referred to as "printer") as an image forming apparatus according to the embodiment. The printer 1 includes an image forming apparatus body 100, a scanner device 200, which is mounted on an upper portion of the image forming apparatus body 100, and an operation panel 300, which is operable by a user. In the following description, the terms "front side" and "back side" mean the front side (the side on which the operation panel 300 is positioned) and the back side of the printer 1, respectively. The terms "left side" and "right side" mean the left side and the right side viewed from the front side of the printer 1, respectively.

Figure 2:
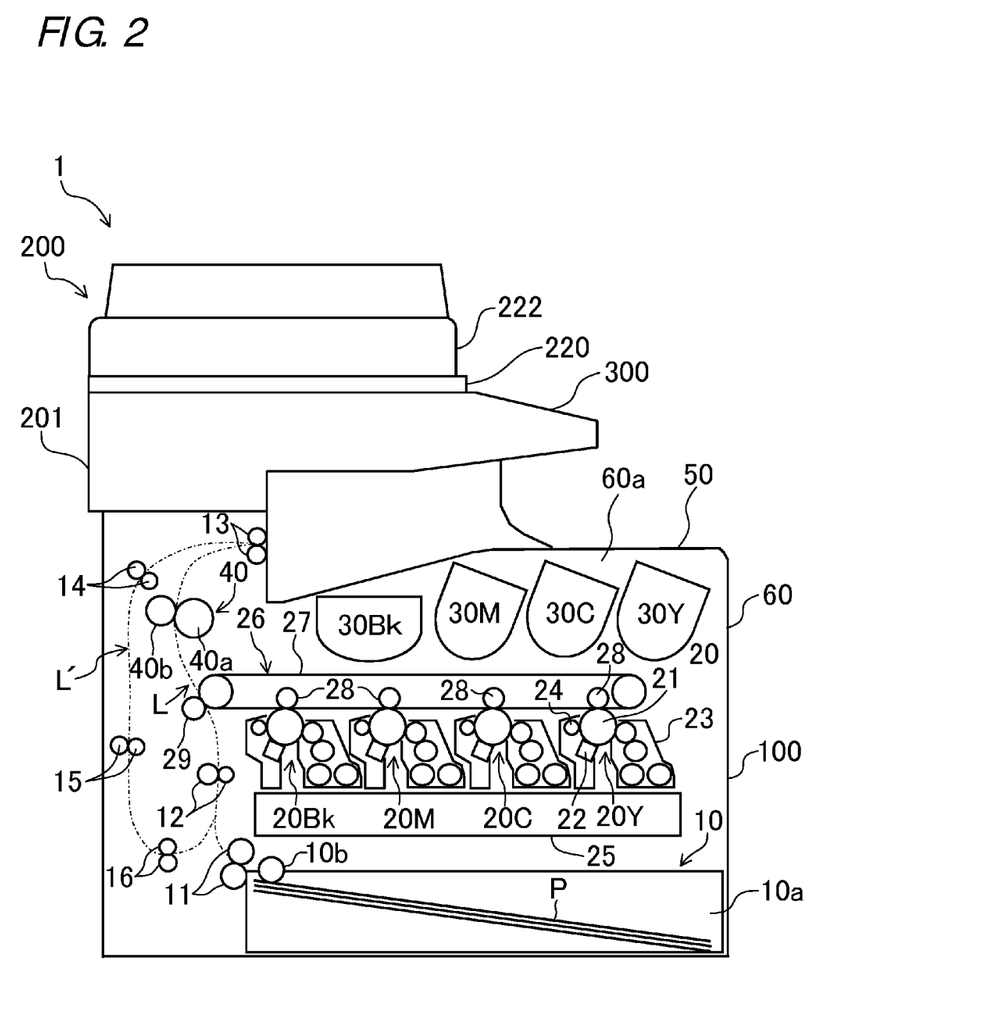
FIG. 2 schematically illustrates the internal structure of the image forming apparatus body according to the one embodiment viewed from the left side of the apparatus.

As illustrated in FIG. 2, the image forming apparatus body 100 includes a box-shaped housing 60. The housing 60 has a top surface that is openably/closably covered with the scanner device 200. The top surface portion of the front side portion in the housing 60 is obstructed by a sheet discharge tray unit 50. The sheet discharge tray unit 50 is supported by the housing 60 and has a front end side that is turnable in the vertical direction.

The above-described housing 60 houses a paper sheet feeder 10, an image forming unit 20, and a fixing unit 40. A plurality of conveyance roller pairs 11 to 13, which sandwich a paper sheet P to convey, are arranged in a paper sheet conveyance passage L, which is from the paper sheet feeder 10 to the sheet discharge tray unit 50. There is provided a reversing conveyance path L', which branches off from the downstream side of the paper sheet conveyance passage L, merges into the upstream side. A plurality of conveyance roller pairs 14 to 16 are arranged in the reversing conveyance path L'.

The above-described paper sheet feeder 10 is arranged in the lower portion inside the housing 60. The paper sheet feeder 10 includes a sheet feed cassette 10a, in which the sheet-shaped paper sheets P are housed, and a pickup roller 10b, which extracts the paper sheets P inside the sheet feed cassette 10a and sends out of the cassette. The paper sheet P sent out of the cassette from the sheet feed cassette 10a is supplied to the image forming unit 20 via the conveyance roller pair 11.

In the image forming unit 20, imaging units 20Bk, 20M, 20C, and 20Y are arranged in one row, which form toner images corresponding to the respective colors of black, magenta, cyan, and yellow. The imaging units 20Bk, 20M, 20C, and 20Y each include a photoreceptor drum 21, a charging apparatus 22, developing equipment 23, and a cleaning apparatus 24. An exposure apparatus 25, which irradiates surfaces of the respective photoreceptor drums 21 with a laser beam, is arranged at the lower part of the imaging units 20Bk, 20M, 20C, and 20Y.

An intermediate transfer unit 26 is arranged above the imaging units 20Bk, 20M, 20C, and 20Y. An intermediate transfer belt 27, which runs in contact with the respective photoreceptor drums 21, is located in the intermediate transfer unit 26. A primary transfer roller 28 is located inside the intermediate transfer belt 27 so as to sandwich the intermediate transfer belt 27 between itself and each of the photoreceptor drums 21. In the downstream side of the imaging unit 20Bk, a secondary transfer roller 29 is located in contact with the surface of the intermediate transfer belt 27. Toner containers 30Bk, 30M, 30C and 30Y are arranged above the intermediate transfer unit 26. The toner containers 30Bk, 30M, 30C, and 30Y store respective colors of toner to be replenished to the respective developing equipment 23 in the imaging units 20Bk, 20M, 20C, and 20Y.

In the image forming unit 20, the exposure apparatus 25 irradiates the surface of each of the photoreceptor drums 21 with the laser beam based on the predetermined image data (such as original image data scanned by the scanner device 200), to form electrostatic latent images. The developments of the formed electrostatic latent images with the developing equipment 23 form toner images with the respective colors. The toner images with respective colors, which are formed on the surfaces of the respective photoreceptor drums 21, are transferred on the surface of the intermediate transfer belt 27 to be superimposed by the primary transfer rollers 28. Subsequently, the toner image that is transferred on the intermediate transfer belt 27 is transferred by the secondary transfer roller 29 to the paper sheet P supplied by the paper sheet feeder 10. The paper sheet P is supplied to the fixing unit 40 after the transfer.

In the fixing unit 40, applying pressure on the paper sheet P supplied by the image forming unit 20 between a fixing roller 40a and a pressure roller 40b fixes the toner image to the paper sheet P. Subsequently, the paper sheet P, to which the toner image is fixed in the fixing unit 40, is sent out to the downstream side by both rollers of 40a and 40b. The paper sheet P sent out of the fixing unit 40 is discharged to the above-described sheet discharge tray unit 50 via the plurality of conveyance roller pairs 12 and 13. The paper sheet P is reversely fed by the conveyance roller pair 13 to be conveyed to the reversing conveyance path L' when forming the toner images on both sides of the paper sheet P.

Figure 3:
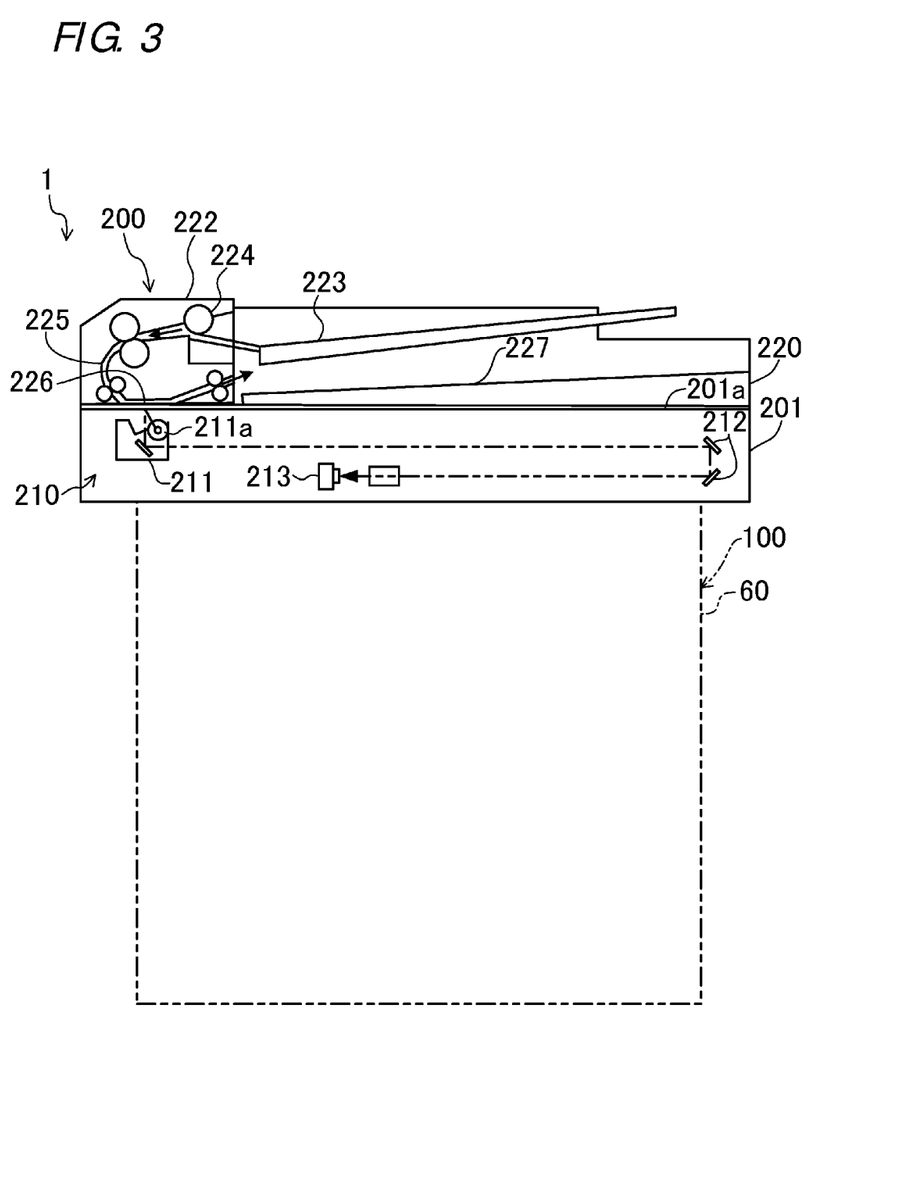
FIG. 3 schematically illustrates the internal structure of a document feeder viewed from the left side of the apparatus.

As illustrated in FIG. 3, the above-described scanner device 200 includes a document reading unit 201 and a document cover 220. The document reading unit 201 is constituted of the casing in a shape of an approximately rectangular solid. The document reading unit 201 is turnably mounted on the upper portion of the image forming apparatus body 100 via a supporting shaft 202 (see FIG. 8). The document reading unit 201 openably/closably covers the top surface of the housing 60 by turning around the supporting shaft 202 as pivot. Turning the document reading unit 201 from the position in the closed state to the upper side ensures the top surface of the housing 60 to be opened and releases the sheet discharge tray unit 50 upwardly. Opening the sheet discharge tray unit 50 allows a user to access the inside of the image forming apparatus body 100 through an open area 60a. This allows a user to perform various maintenance operations via the open area 60a such as exchange of the toner containers 30Bk, 30M, 30C and 30Y, and demounting of the intermediate transfer belt 27 and the imaging units 20Bk, 20M, 20C, and 20Y.

A scanner unit 210 is housed within the above-described document reading unit 201. The document reading unit 201 has a top surface that constitutes a document loading surface 201a, on which an original document is placed. An approximately rectangular-shaped opening (not illustrated) is formed on the document loading surface 201a. An exposure glass is embedded in this opening.

The scanner unit 210, which is housed within the above-described document reading unit 201, optically reads the original document placed on the exposure glass in the document loading surface 201a to generate its image data. Specifically, the scanner unit 210 includes a reading unit 211, a reflection mirror 212, and a charge-coupled device (CCD) sensor 213. The reading unit 211, during scanning the image, moves to the sub-scanning direction (the lateral direction in FIG. 3), irradiating the original document on the exposure glass with the lights from an LED light source 211a. The reflection mirror 212 guides a reflected light from the original document to the CCD sensor 213. The CCD sensor 213 photoelectrically converts the light received to generate the image data of the document image. The generated image data is stored in a data storage unit (not illustrated).

The above-described document cover 220 is turnably mounted on the upper portion of the image forming apparatus body 100 via the supporting shaft 202. The document cover 220 is constituted so as to openably/closably cover the document loading surface 201a by turning around the supporting shaft 202 as pivot.

An automatic document feeder 222 is assembled on the top surface side of the document cover 220. That is, the automatic document feeder 222 and the document cover 220 are unitized as one unit. The automatic document feeder 222 is constituted so as to perform the following processes: sending out the original document on a document feed tray 223 one sheet after another to a document conveyance path 225 with a feed roller 224; causing the original document to pass through at a predetermined document read position 226 on the exposure glass; subsequently, discharging to a document discharge tray 227. The scanner unit 210 captures the original document image that is passing through the document read position 226 to generate its image data. When the document cover 220 and the automatic document feeder 222 are unitized, the entire apparatus is subject to lose weight balance when opening the document cover. Thus, the disclosure is particularly useful in such configuration.

Figure 4:
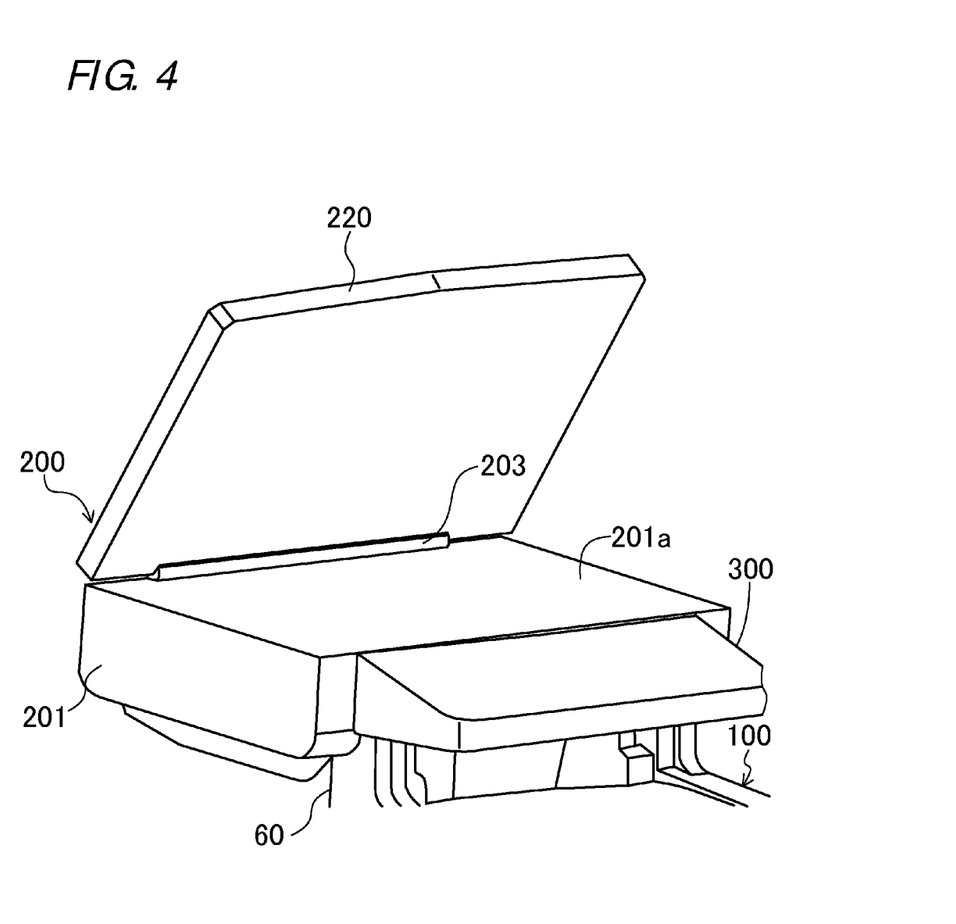
FIG. 4 illustrates an upper portion of the image forming apparatus where the document cover is in open state viewed from a diagonally leftward of the front side of the apparatus.
Figure 5:
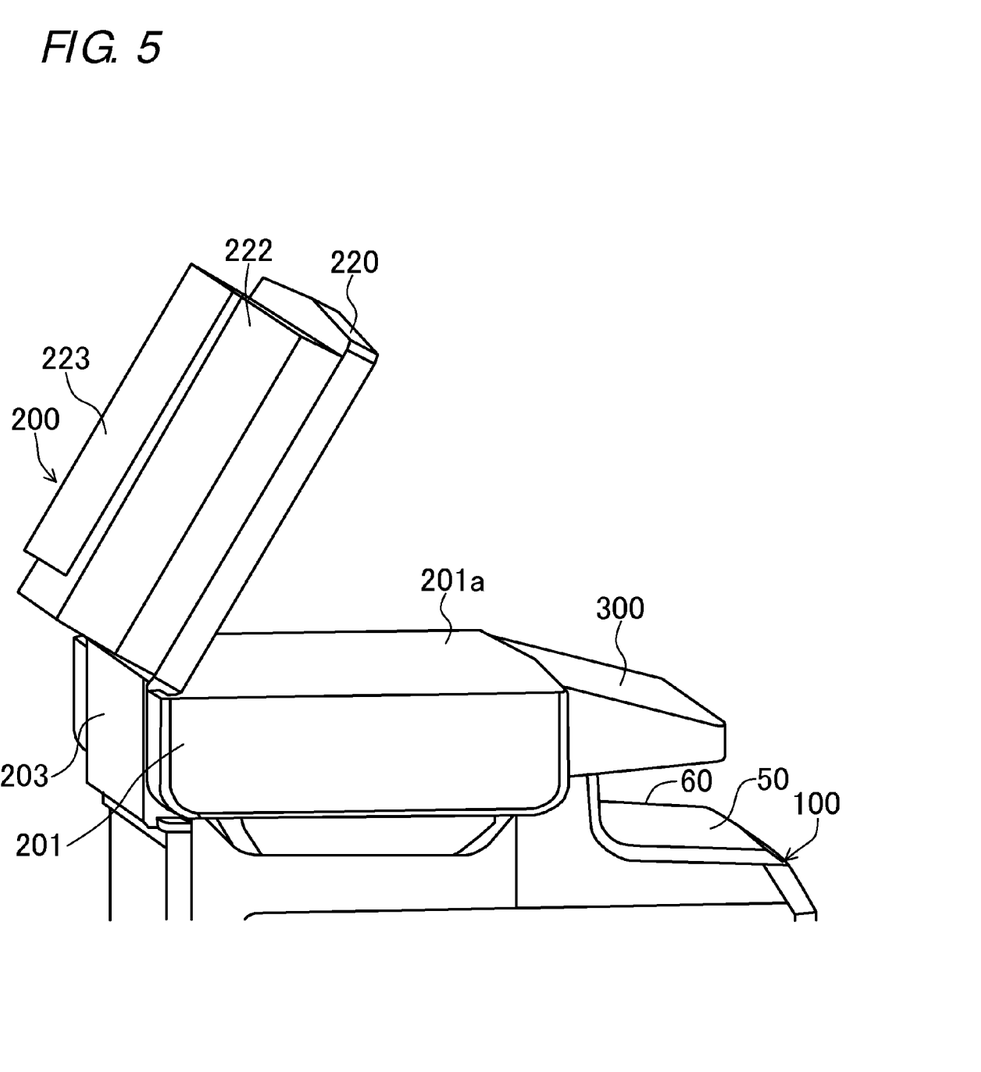
FIG. 5 illustrates a state where the document cover is open viewed from a diagonally backward of the left side of the apparatus.
Figure 11:
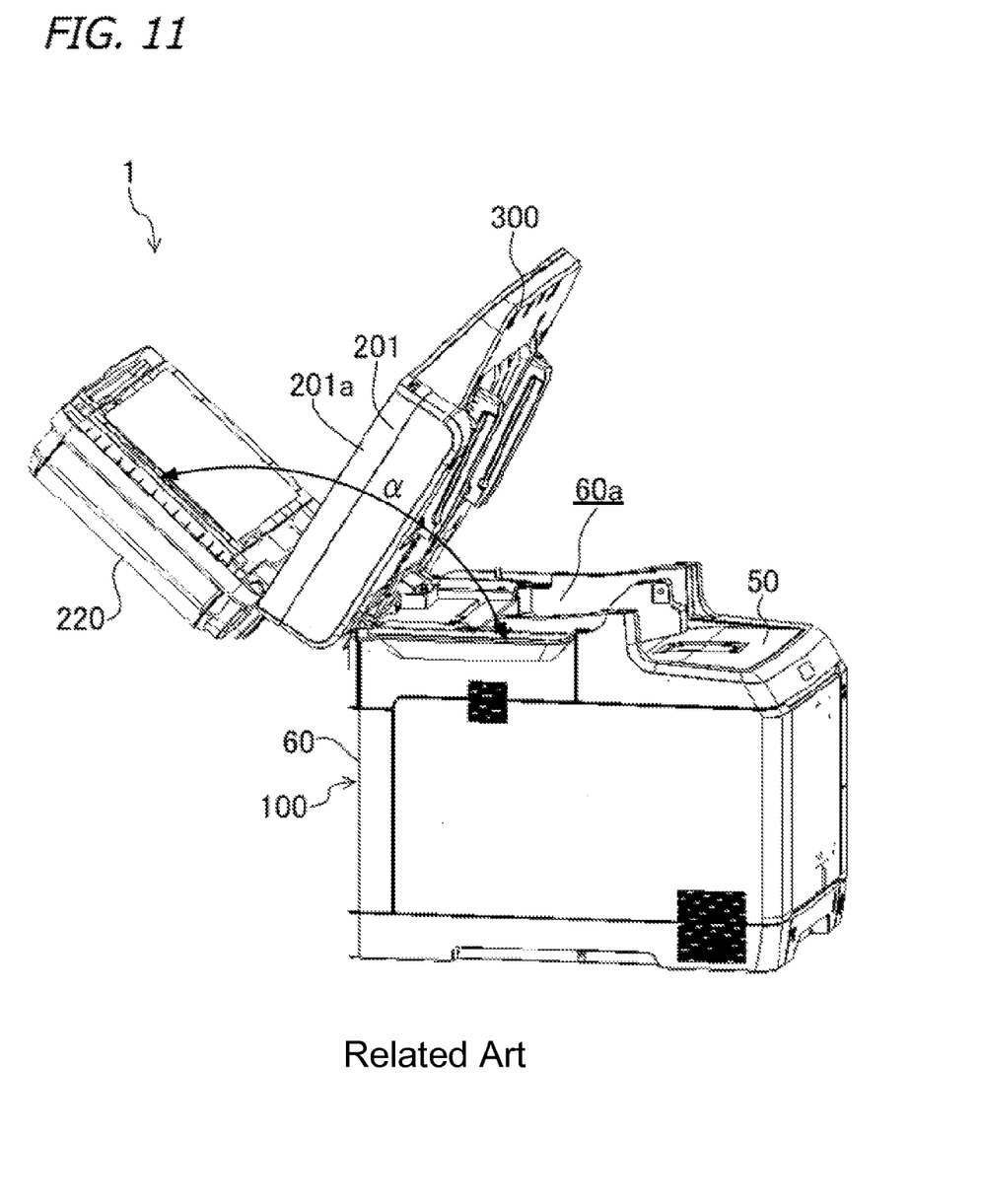
FIG. 11 diagonally illustrates an image forming apparatus according a related art in a state where both the document cover and the document reading unit are each open.

FIG. 4 and FIG. 5 illustrate a state where opening the document cover 220 while the document reading unit 201 is in close state. In this state, a user can set the original document on the document loading surface 201a. According to related printers, since the document cover has been pivotably supported with respect to the document reading unit, a state, where opening the document reading unit while the document cover is in open state, might cause the excessive opening degree α of the document cover. This caused a problem that the printer 1 lost the weight balance of the entire apparatus (see FIG. 11). To get around this problem, the embodiment is to provide that both the document reading unit 201 and the document cover 220 can be pivotably supported by the image forming apparatus body 100.

Figure 6:
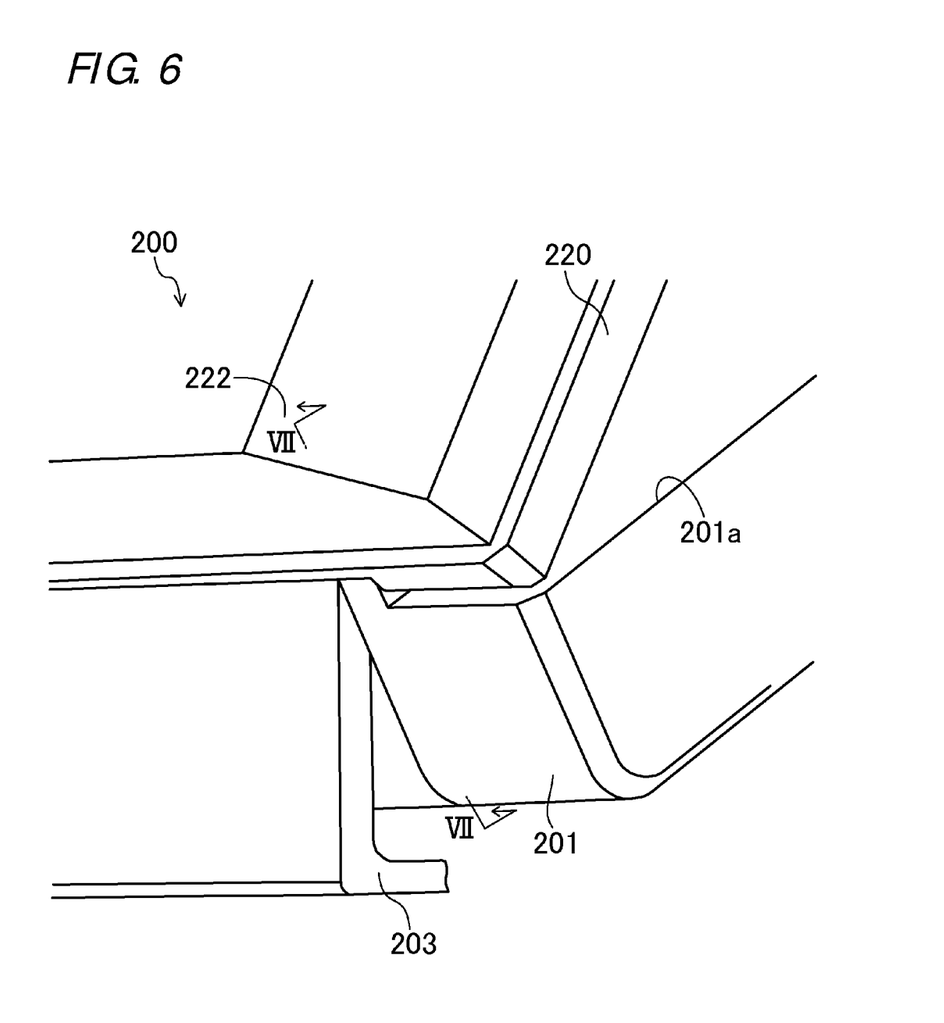
FIG. 6 illustrates an enlarged connecting portion of the document cover and the document reading unit viewed from a diagonally leftward of the back side of the apparatus.
Figure 7:
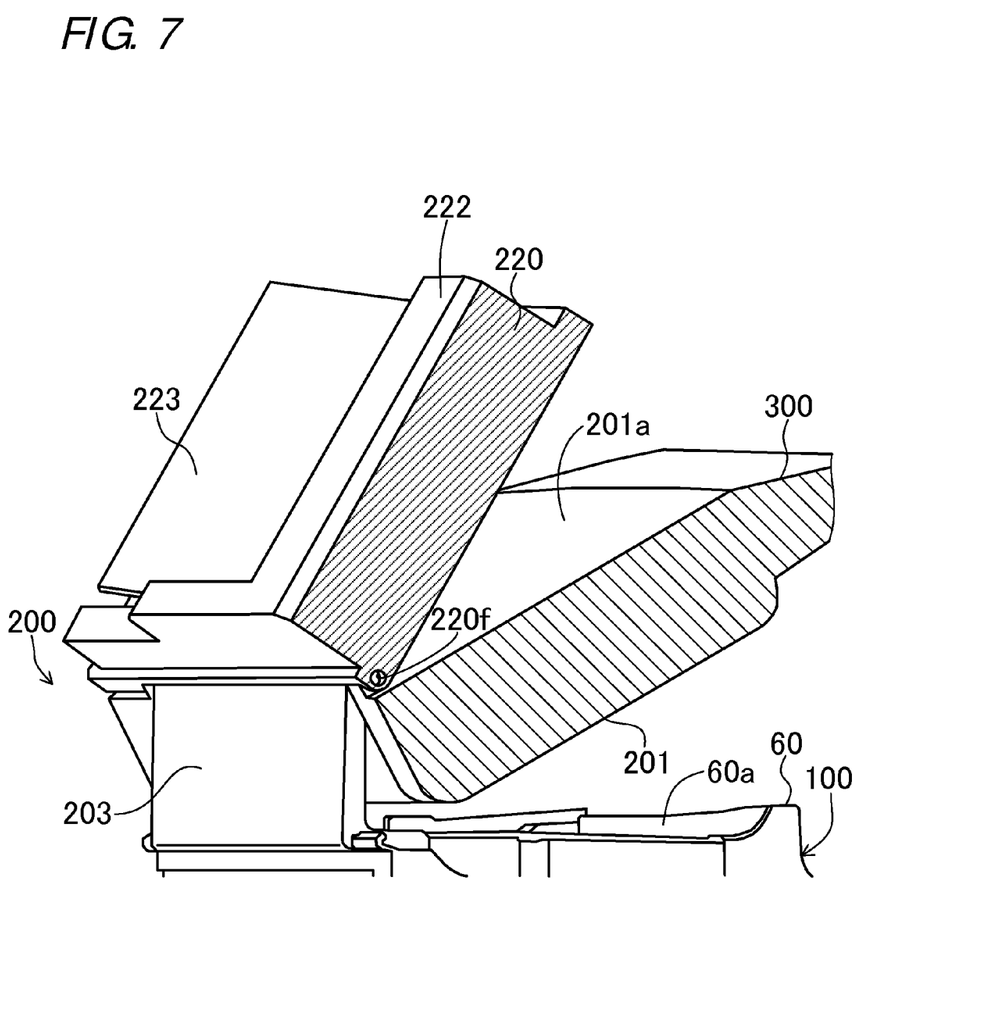
FIG. 7 illustrates a cross-section taken along the line VII-VII of FIG. 6.
Figure 8:
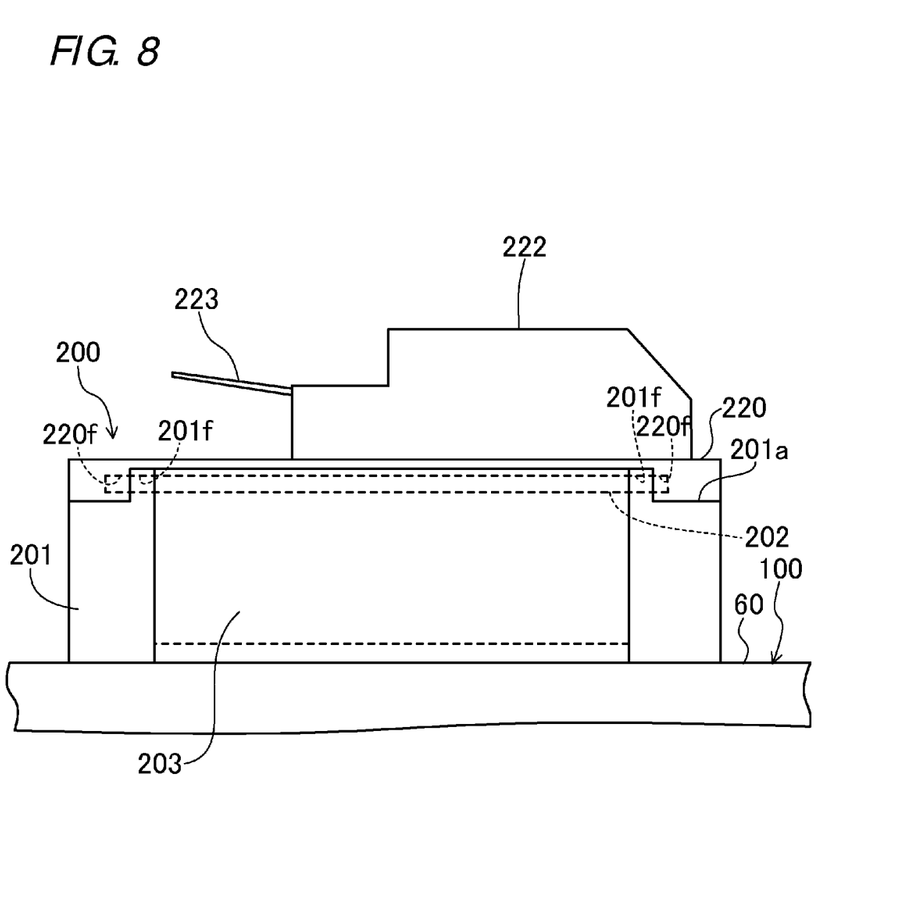
FIG. 8 schematically illustrates the upper portion of the image forming apparatus viewed from the back side of the apparatus.

Specifically, as illustrated in FIG. 6 to FIG. 8, the document reading unit 201 and the document cover 220 is supported via the supporting shaft 202 (see FIG. 8) with respect to a fixing bracket 203 located in the upper portion of the image forming apparatus body 100. The fixing bracket 203 is secured to the back end edge of the upper end portion of the housing 60. The fixing bracket 203 extends over nearly overall length of the lateral direction of the housing 60 and forms a shape of an L viewed from the lateral direction. The fixing bracket 203 is a part of the image forming apparatus body 100. The supporting shaft 202 penetrates the upper end portion of the fixing bracket 203 in the lateral direction and projects through each of its right and left side surfaces. The fixing bracket 203 and the supporting shaft 202 are unitized, and are detachably mounted on the housing 60.

Fit-in holes 201f and 220f are formed in the rear end portion of both the document reading unit 201 and the document cover 220, respectively. The respective fit-in holes 201f and 220f fit the right and left protrusion portions of the corresponding supporting shaft 202. As a result of that, the document reading unit 201 and the document cover 220 are turnable around the supporting shaft 202 as pivot. Accordingly, the document reading unit 201 and the document cover 220 accurately correspond with the rotational center. A stopper member (not illustrated) is mounted in the rear end portion of the above-described document cover 220. The stopper member contacts the fixing bracket 203 to regulate its rotation, ensuring that the opening degree α of the document cover 220 will not exceed the predetermined degree.

Figure 9:
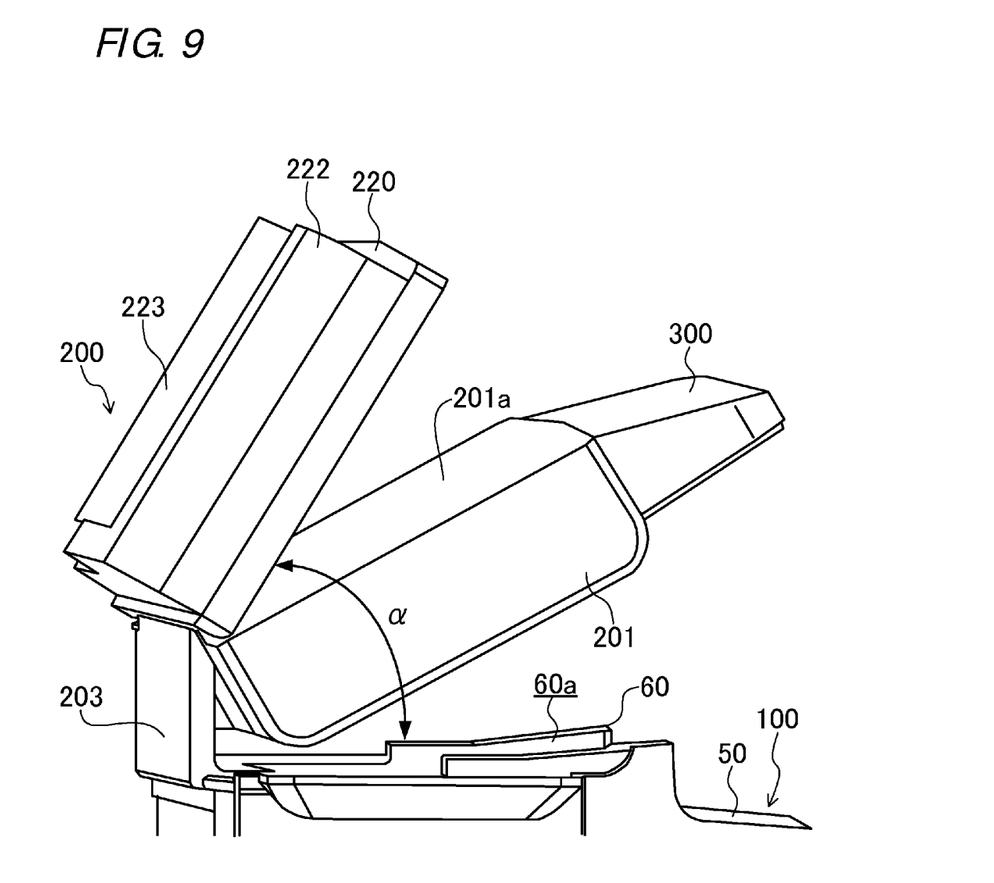
FIG. 9 illustrates a state where the document cover and the document reading unit are each open viewed from a diagonally backward of the left side of the apparatus.

Accordingly, the embodiment ensures that the document cover 220 will not turn around together with the document reading unit 201, unlike the related examples (see FIG. 11), even if the document reading unit 201 is opened while the document cover 220 is in open state. That is, as illustrated in FIG. 9, the document reading unit 201 can be opened at a constant opening degree α of the document cover 220. Thus, the problem, which causes the printer 1 to lose the weight balance due to the excessive opening degree α of the document cover 220, can be prevented, even if no lock mechanism is provided.

In addition, the document reading unit 201 can be opened and closed independently of the document cover 220. This ensures that the physical burden on the user, who is operating the document reading unit 201 to open and close, can be reduced compared with the related examples.

The unitization of the fixing bracket 203 and the supporting shaft 202 to be detachably mounted on the housing 60 facilitates the mounting of the document reading unit 201 on the housing 60. The configuration for supporting the document reading unit 201 is not required to be located in the housing 60, and the cost of the member and the production for the housing 60 can be reduced accordingly. In addition, a configuration without the document reading unit 201 mounted on the housing 60 can be easily used as a stand-alone printer.

Other Embodiments

Figure 10:
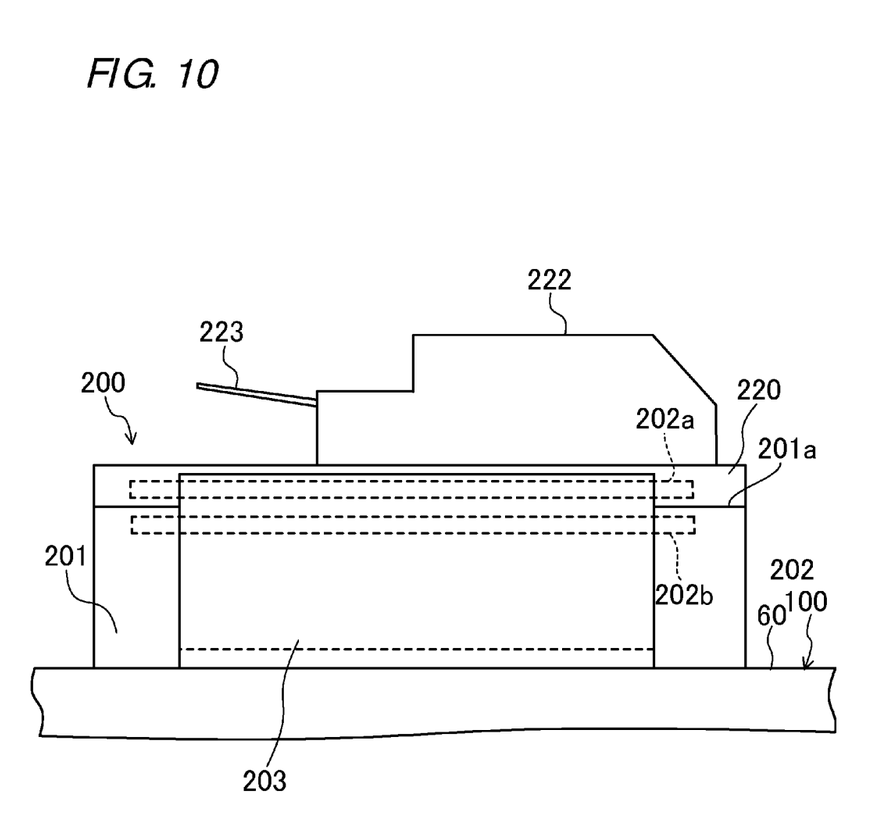
FIG. 10 schematically illustrates an upper portion of an image forming apparatus according to another embodiment viewed from the back side of the apparatus.

According to the embodiment described above, the supporting shaft 202 for the reading unit which pivotably supports the document reading unit 201, and the supporting shaft 202 for the cover which pivotably supports the document cover 220 are constituted of the same member. This, however, should not be construed in a limiting sense. As illustrated in FIG. 10, for example, a reading-unit-supporting shaft 202a may be provided as a member separated from a cover-supporting shaft 202b. However, the configuration where both shafts are constituted of the same member, achieves a reduction in the number of components compared with that of different members.

According to the embodiment described above, the document cover 220 is integrated with the automatic document feeder (ADF) 222. This, however, should not be construed in a limiting sense. The automatic document feeder 222 may be omitted.

According to the embodiment described above, the image forming apparatus may be considered to be the laser printer 1 based on an electrophotographic system. This, however, should not be construed in a limiting sense. The printers such as an ink jet printer may be applicable.

As stated previously, the disclosure is useful for the image forming apparatus that includes the document reading unit and the document cover. Especially, the disclosure is especially useful for the image forming apparatus where the document cover is integrated with the automatic document feeder.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An image forming apparatus, comprising:
an image forming apparatus body;
a document reading unit configured to turn to openably/closably cover an upper portion of the image forming apparatus body;

a document cover configured to turn to openably/closably cover a document loading surface at a top surface of the document reading unit;

an image reading unit configured to read an original document placed on the document loading surface and to generate image data of the original document;

an image forming unit housed in the image forming apparatus body, the image forming unit being configured to form an image on a paper sheet based on the image data;

a reading-unit-supporting shaft supporting the document reading unit on the image forming apparatus body, pivotably about a rotational center; and a cover-supporting shaft supporting the document cover on the image forming apparatus body, pivotably about a rotational center; wherein the rotational centers of the reading-unit-supporting shaft and the cover-supporting shaft coincide.

2. The image forming apparatus according to claim 1, wherein the reading-unit-supporting shaft and the cover-supporting shaft are equivalent components.

3. The image forming apparatus according to claim 1, wherein:

the image forming apparatus body includes a housing that is open to an upper side and internally houses the image forming unit, and a fixing bracket portion located at an upper portion of the housing, the reading-unit-supporting shaft and the cover-supporting shaft being attached to the fixing bracket portion; and the reading-unit-supporting shaft, the cover-supporting shaft, and the fixing bracket portion are unitized and are detachably mounted on the housing.

4. The image forming apparatus according to claim 1, further comprising:

an automatic document feeder configured to automatically supply the original document to a document read position set on the document loading surface; wherein the document cover and the automatic document feeder are unitized.

* * * * *